Nov. 8, 1966  P. D. BAYNE ETAL  3,283,530

BEVERAGE DISPENSING AND COOLING APPARATUS

Filed Sept. 13, 1965  2 Sheets-Sheet 1

INVENTORS
PETER D. BAYNE
JAMES J. SOLOMON
BY
Andrus & Starke
Attorneys

INVENTORS
PETER D. BAYNE
JAMES J. SOLOMON
BY Andrus & Starke
Attorneys

United States Patent Office 3,283,530
Patented Nov. 8, 1966

3,283,530
BEVERAGE DISPENSING AND COOLING APPARATUS
Peter D. Bayne and James J. Solomon, Milwaukee, Wis., assignors to Jos. Schlitz Brewing Company, Milwaukee, Wis., a corporation of Wisconsin
Filed Sept. 13, 1965, Ser. No. 486,769
9 Claims. (Cl. 62—389)

This application relates to a beverage dispensing and refrigerating apparatus and more particularly to a household draft beer dispensing unit including an integral refrigerating system.

One of the greatest needs of the off-premise or outdoor beer drinker is that of maintaining the beer at a uniform chilled temperature for drinking, particularly when external means of artificial refrigeration is not available. Bottle or canned beer can be chilled outdoors by use of ice chests and the like, but the chests are normally rather large and bulky and require the use of ice. Draft beer, which is generally sold in kegs, presents a more serious problem of refrigeration when used in off-premise or outdoor locations, and is customarily cooled by setting the keg in a bucket or container of iced water. This not only provides rather unsatisfactory cooling for the beer, but requires the use of large quantities of ice to provide the necessary chilling effect. Moreover, the conventional draft beer systems are not adapted for home use and as they generally are bulky they will not fit into the available household refrigerator and are looked upon with disfavor by the housewife.

The present invention is directed to a self-refrigerated draft beer system which can be used outdoors and is compact in size so that it can be also employed in the home. More specifically, the unit includes an outer insulated casing which defines a cooling chamber and a liquified gas chamber. A keg or container is located within the cooling chamber and contains the beer or other beverage to be chilled and dispensed. The keg is spaced inwardly of the walls of the casing and the space between the keg and the casing is filled with a heat transfer liquid, such as propylene glycol, methanol or the like.

The liquified gas chamber contains a liquified gas under pressure, such as nitrogen, carbon dioxide, helium or the like, and a tube connects the liquified gas chamber with the bottom of the cooling chamber. The liquified gas is metered through the tube and is expanded into contact with the heat transfer liquid and the latent heat of vaporization of the liquid creates a refrigerating effect which cools the heat transfer liquid. Cooling the heat transfer material in turn serves to cool the beer contained within the keg or container.

The fully expanded gas collects in the top of the cooling chamber and the pressure of the gas within the beverage chamber is maintained at a constant level by means of a pressure relief valve. As an added feature of the invention, the expanded gas at the top of the cooling chamber is metered through a line to the top of the beer keg or container. The liquified gas thus performs a dual function in not only providing a refrigerating effect to cool the beer, but the expanded gas is also employed to provide counter-pressure on the beer to retain the dissolved carbon dioxide in the beer and protect the beer against the ingress of air and microbiological organisms. Moreover, the pressure of the gas acting on the beer displaces the volume of beer as it is dispensed and permits the removal of the beer by a pressure differential rather than gravity.

The dispensing unit of the invention is a compact unit having an integral refrigerating system capable of maintaining the beer at a given temperature for a period of several days. The unit does not include any moving mechanical parts and does not require any external outside services, such as electricity, water or the like.

The liquified gas which is employed to provide the cooling effect of the beer can also be used to provide pressure on the beer within the inner keg or container to prevent the escape of carbon dioxide from the beer and provide a pressure differential which aids in dispensing the beer from the keg.

Other objects and advantages will appear in the course of the following description.

The drawings illustrate the best mode presently contemplated of carrying out the invention.

Figure 1:
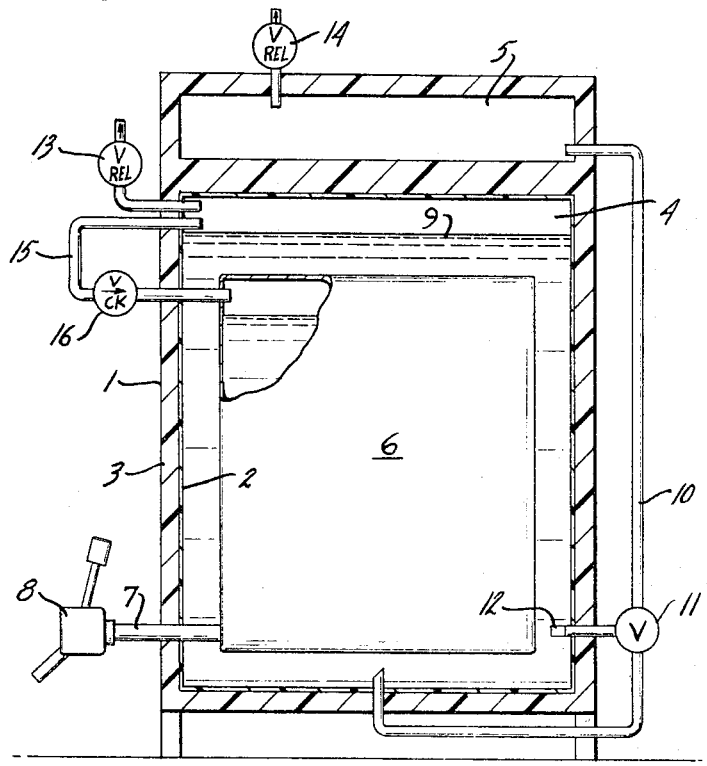
FIG. 1 is a vertical section of a dispensing unit of the invention.

The drawings illustrate a unit for refrigerating and dispensing draft beer or other carbonated beverages. The unit includes an outer insulating casing 1 which is preferably formed of a layer of cardboard or plastic 2 surrounded by a heating insulating layer of foam plastic 3.

The casing 1 defines a cooling chamber 4 and a liquid gas chamber 5. Located within the cooling chamber is a keg 6 or container which contains the beer or other beverage to be refrigerated and dispensed. The keg 6 is supported above the bottom surface of casing 1 by a series of legs or supports, not shown.

To dispense the beverage from the keg 6, a tube 7 is connected to the lower end of the keg and extends through the front wall of the casing 1. A conventional spigot 8 is connected to the tube 7 and by manually operating the spigot 8, the beer or other beverage can be dispensed from the keg 6.

Surrounding the keg 6 in the cooling chamber 4 is a liquid heat transfer material 9. The heat transfer material 9 is a liquid having a relatively low freezing point, generally below 10° C., so that the liquid will not locally freeze when the liquified gas is expanded therein. Materials such as propylene glycol, methanol, mercury, silicone compounds and the like can be employed as the heat transfer liquid. It is preferred to use a relatively viscous heat transfer liquid so that as the liquified gas is expanded within the heat transfer material, the bubbles of the gas will move slowly upwardly within the heat transfer liquid to provide an increased and more uniform cooling effect.

The liquified gas contained within the chamber 5 can be nitrogen, carbon dioxide, Freon, helium, or any other gas which can be liquified under ordinary pressures and which will have a relatively high latent heat of vaporization on expansion to the gaseous state.

A line, or conduit 10 connects the liquid gas chamber 5 with the bottom of the cooling chamber 4 and a valve 11 is located in line 10 and controls the rate of expansion of the liquified gas. The operation of valve 11 is automatically controlled by a conventional temperature sensing device 12 which is located in the cooling chamber 4 in contact with the heat transfer liquid. When the temperature of the heat transfer medium increases to a value above the preset value, which is generally about 40° F., the temperature sensing device 12 will operate to open the valve 11 and a portion of the liquified gas will vaporize and expand in contact with the heat transfer liquid 9. The latent heat of vaporization of the vaporizing liquid will chill the heat transfer material which in turn will cool the beer located within the keg 6. The heat transfer liquid 9, which surrounds the keg 6, not only provides a more uniform cooling effect for the beer, but prevents the liquified gas, as it is expanded in the bottom of the chamber 4, from locally freezing the beer.

The fully expanded gas is collected in the upper portion of the chamber 4 above the level of the heat transfer material 9 and the pressure of the gas within the upper portion of the chamber 4 is maintained at a constant level by means of a pressure relief valve 13 connected in a line which communicates with the upper end of the chamber 4. The pressure relief valve is normally set by a value of about 18 p.s.i.g. In addition, a second pressure relief valve 14 is connected to the liquified gas chamber 5 to maintain the pressure of the liquified gas at a preset value, generally about 50 p.s.i.g.

As an additional feature of the invention, the expanded gas, which is located in the upper portion of the cooling chamber 4, is employed to provide counter-pressure on the beer in the keg 6 to prevent the carbon dioxide in the beer from coming out of solution and also to provide a pressure differential to aid in dispensing the beer from the keg. In this regard, a line or conduit 15 is connected between the upper end of the cooling chamber 4 and the upper end of the keg 6 and a check valve 16 is located in the line 15. The check valve permits the gas to flow from chamber 4 into the keg 6 but prevents the flow of gas or beer in the opposite direction. As the beer is dispensed from the keg 6, additional volumes of gas are admitted to the keg to maintain the constant counter-pressure in the keg. If a pressure drop should occur in the upper end of the cooling chamber 4, the check valve 16 will prevent beer from being drawn back into the chamber 4.

Figure 2:
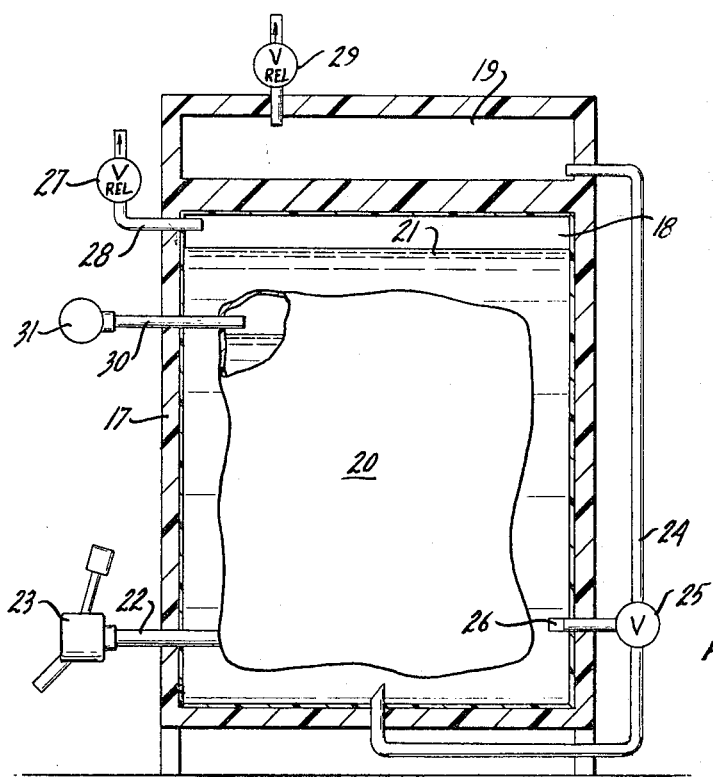
FIG. 2 is a view similar to FIG. 1 showing a modified form of the invention in which a plastic bag is used to contain the beer.

FIG. 2 illustrates a modified form of the invention and the unit shown in FIG. 2 includes an outer casing or jacket 17, similar in construction to the casing 1, which defines a cooling chamber 18 and a liquified gas chamber 19. In this embodiment the beer is contained within a flexible plastic bag 20 which is located in the cooling chamber and floats within the heat transfer liquid 21 contained therein. A tube 22 is connected to the lower portion of the bag and extends through the wall of the casing, and the beer can be dispensed from the bag by manual operation of a spigot 23 which is connected to the tube 22 on the outside of the casing.

As in the case of the first embodiment, the liquid gas chamber 19 contains a liquified gas, such as nitrogen, and a gas line 24 connects the liquid gas chamber 19 with the lower portion of the cooling chamber 18. A valve 25 is located in the gas line 24 and is operably connected to a temperature-sensing device 26 located within the cooling chamber in contact with the heat transfer material 21. The temperature-sensing device 26 acts in the manner of temperature-sensing device 12 and will open the valve 25 to admit additional liquid nitrogen when the temperature of the heat transfer material falls below the present value.

As in the first embodiment, a pressure relief valve 27 is connected in a line 28 which extends outwardly from the upper end of the chamber 18 and valve 27 serves to maintain the pressure of the fully expanded gas at a given value in the top of chamber 18. In addition, a second pressure relief valve 29 is connected to the liquid gas chamber 19 and serves to maintain the liquified gas at a preset pressure.

In the embodiment shown in FIG. 2, the pressure of the fully expanded gas is not employed to provide counter-pressure on the beer within the bag 20. Instead, a line 30 is connected to the upper portion of the bag and extends outwardly through the wall of the casing 1. A flexible bulb 31 is connected to the outer end of the line 30 and by squeezing the bulb, air is introduced through the tube 30 into the upper portion of the bag. The air acts to apply counter-pressure to the beer within the bag and prevents the escape or dissolution of the carbon dioxide from the beer and maintains a positive pressure on the beer to aid in dispensing the same from the bag.

In this embodiment, the latent heat of vaporization resulting from the vaporization of the liquified gas cools the heat transfer liquid and this thereby chills the beer within the bag.

Figure 3:
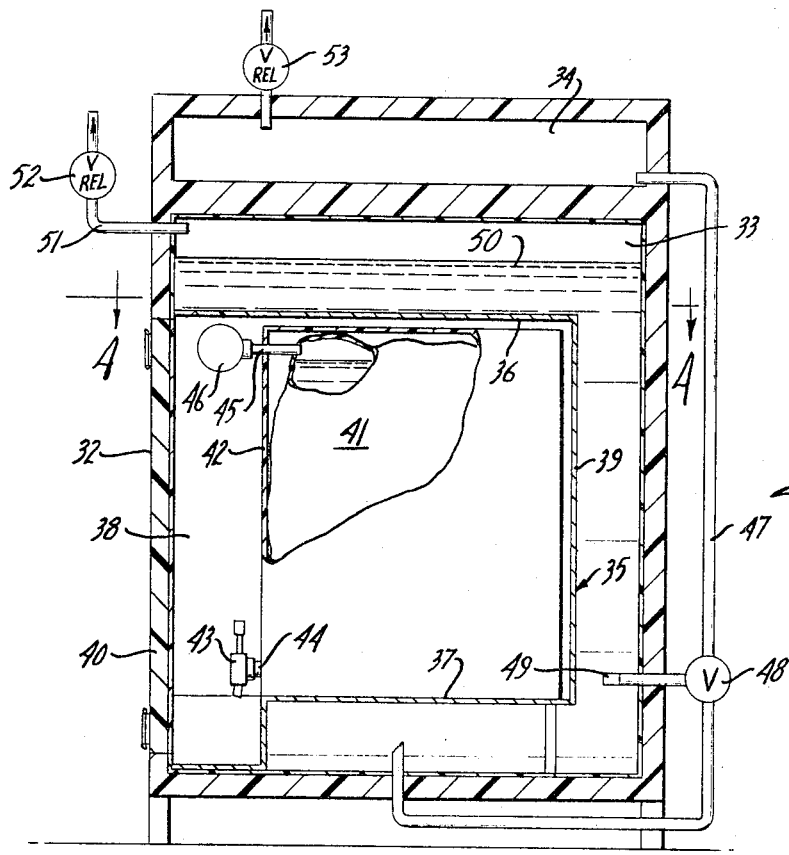
FIG. 3 is a vertical section of a second modified form of the invention.
Figure 4:
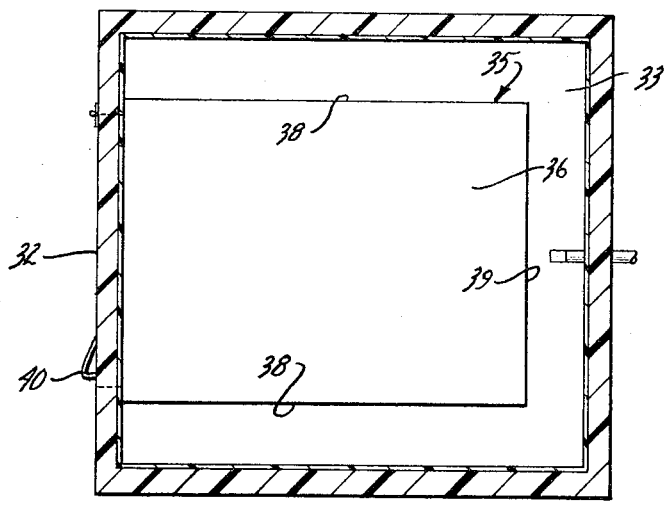
FIG. 4 is a section taken along line 4—4 of FIG. 3.

FIGS. 3 and 4 illustrate a second modified form of the invention which includes an outer casing or jacket 32 similar in construction to casing 1. The casing 32 defines a cooling chamber 33 and an upper liquified gas chamber 34 containing liquified nitrogen or the like. Located within the lower chamber 33 is a metal shell 35 which includes a top wall 36, a bottom wall 37, a pair of side walls 38 and an end wall 39. The casing 32 is provided with an insulated access door 40 which encloses the open end of the shell 35.

The beer or other beverage to be chilled is contained within a flexible plastic bag 41 located within an outer rigid cardboard or plastic box 42. The bag 41 and box 42 are supported on the bottom wall 37 of shell 35. The beer is dispensed from the bag 42 by means of a manually operated spigot 43 located in a conduit or tube 44 connected to the lower portion of the bag 41. To apply counter-pressure to the beer within the plastic bag, a line 45 is connected to the upper end of the bag and a flexible bulb 46 is attached in the line 44. By squeezing the bulb, air will be introduced into the upper end of the bag 41 to apply counter-pressure to the beer, in the manner in which bulb 31 operates to apply pressure to the beer within the bag 20 of the second embodiment.

Line 47 is connected between the liquid gas chamber 34 and the bottom of the chamber 33 and a valve 48 is located within the line and is operably connected to temperature-sensing device 49, similar in structure and function to temperature sensing device 12 of the first embodiment. As the temperature of the heat transfer liquid 50 located in the space between casing 32 and shell 35 rises above a preset value, the temperature sensing unit 49 will operate to open the valve 48 and permit the liquefied gas to expand into the chamber 33. The latent heat of vaporization thus chills the heat transfer liquid 50 surrounding the shell 35, and cooling of the shell will result in a chilling of the beer within the bag 41.

To maintain the pressure of the gas in the upper end of the liquid chamber 34 at a preset level, a line 51 extends outwardly from the upper end of the chamber 34 and a pressure relief valve 52 is connected in the line 49. In addition, a second pressure relief valve 53 is connected to the liquid gas chamber 34 and maintains the liquefied gas in chamber 33 at a given preset value.

The unit shown in FIGS. 3 and 4 has the advantage that the entire beer-containing package, including the bag 41 and box 42, can be removed from within the shell 35 when the beer has been dispensed and replaced with a full package. With the units shown in FIGS. 1 and 2, the user could not, in normal practice, replace the beer-containing package but would have to return the entire unit to the brewery for refilling.

While the beer is shown as being contained in a bag 41 located within an outer box 42, keg, bottle or can beer can also be chilled in the compartment defined by shell 35.

The dispensing unit of the invention is extremely compact and includes an integral refrigeration system which is capable of maintaining the beer at a temperature of about 42° F. for a period of several days or more, depending on the ambient temperature. The unit does not require any mechanical moving parts, other than the valve for controlling the flow of the liquefied gas into the cooling chamber, and the unit also does not require any outside services, such as electricity, ice, water or the like.

As illustrated in the embodiment shown in FIG. 1, the expanded gas utilized to provide the refrigerating effect, also provides the dual function in that it provides counter pressure on the beer within the container to prevent the dissolution of carbon dioxide from the beer and to maintain a positive pressure on the beer to aid in dispensing the same from the keg or container.

While the above description has been directed to the dispensing and refrigeration of draft beer, it is contemplated that the unit can also be used to dispense and refrigerate other carbonated beverages.

Moreover, the liquefied gas chamber, while shown as an integral portion the outer casing, can be a separate tank or reservoir, and similarly, the expanded gas can be collected in a separate tank or chamber rather than being collected in the upper end of the cooling chamber.

Various modes of carrying out the invention are contemplated as being within the scope of the following claims particularly pointing out and distinctly claiming the subject matter which is regarded as the invention.

We claim:

1. A device for dispensing and refrigerating a beverage, comprising means defining a cooling chamber and containing a liquid heat transfer material, a container located in heat transfer relation to the heat transfer material, a first reservoir connected to the upper end of the chamber, a second reservoir to contain a liquefied gas under pressure, conduit means connecting the second reservoir to the lower portion of the cooling chamber, means operably associated with said conduit means for expanding the liquefied gas into contact with the heat transfer material to thereby chill the heat transfer material and cool the beverage contained within the container, said liquefied gas being expanded to the gaseous state and the gas passing upwardly through the heat transfer material and being collected in the first reservoir, pressure relief valve means connected to the first reservoir for maintaining the gas at a given pressure, second conduit means connecting the first reservoir with the upper end of the container for supplying gas to the container, check valve means located in said second conduit means for permitting the flow of gas from said first reservoir to the container and for preventing the flow of fluid in the opposite direction, and dispensing means for dispensing a beverage from said container.

2. An apparatus for refrigerating and dispensing a beverage, comprising casing means defining a cooling chamber and containing a liquid heat transfer material, a container containing a beverage to be dispensed and located within the chamber in heat transfer relation to the heat transfer material, a reservoir to contain a liquefied gas, first conduit means connecting the reservoir with the lower end of the cooling chamber, valve means located in the first conduit means, temperature-sensing means responsive to the temperature of the heat transfer material and operably connected to said valve means for opening the valve means when the temperature of the heat transfer material increases above a preset value, said liquefied gas expanding in contact with the heat transfer material to cool the same and thereby chill the beverage within the container, and dispensing means connected to the lower portion of the container for dispensing a beverage from the container.

3. An apparatus for dispensing and refrigerating a beverage, comprising casing means defining a cooling chamber containing a heat transfer liquid, a container located within the chamber in heat transfer relation to the heat transfer liquid and containing a beverage, a first reservoir communicating with the upper end of the cooling chamber, a second reservoir to contain a liquefied gas under pressure, conduit means connecting the second reservoir to the lower portion of the cooling chamber, valve means located in said first conduit means, temperature sensing means responsive to the temperature of the heat transfer liquid and operably connected to said valve means for opening the valve means when the temperature of the heat transfer liquid increases above a preset value, said liquefied gas expanding to the gaseous state in contact with the heat transfer liquid to cool the same and thereby chill the beverage within the container and the expanded gas rising upwardly through the heat transfer liquid and being collected in said first reservoir, pressure relief valve means connected to the first reservoir for maintaining the gas at a given pressure, second conduit means connecting the first reservoir with the upper end of the container for supplying gas to the container, check valve means located in said second conduit means for permitting the flow of gas from said first reservoir to the container and for preventing the flow of fluid in the opposite direction, and dispensing means for dispensing the beverage from said container.

4. An apparatus for refrigerating and dispensing draft beer, comprising a casing defining a cooling chamber and a separate liquified gas chamber, a liquid heat transfer material located within the cooling chamber a liquified gas under pressure disposed in said liquified gas chamber, a container containing beer and located within the cooling chamber in contact with the heat transfer material and spaced from the walls of the casing, first conduit means connecting the liquified gas chamber with the lower end of the cooling chamber, means operably associated with said conduit means for expanding the liquified gas into contact with the heat transfer material to thereby chill the heat transfer material and cool the beverage within the container, said liquified gas being expanded to a gaseous state and the gas passing upwardly through the heat transfer liquid and being collected in the upper end of said casing, pressure relief valve means connected to the upper end of the casing for maintaining the expanded gas at a given pressure, second conduit means connecting the upper end of the casing with the upper end of the container for supplying said expanded gas to the container, and dispensing means for dispensing the beer from the container to the exterior of the casing.

5. The apparatus of claim 4 in which the liquified gas is nitrogen and the heat transfer material is propylene glycol.

6. An apparatus for refrigerating and dispensing a carbonated beverage, comprising casing means defining a cooling chamber and containing a liquid heat transfer material, a flexible bag containing a beverage to be dispensed and located within the chamber and spaced from the walls of said casing means, said flexible bag being in heat transfer relation to the heat transfer material, a reservoir to contain a liquified gas, first conduit means connecting the reservoir with the cooling chamber, valve means located in the first conduit means, temperature sensing means responsive to the temperature of the heat transfer material and operably connected to said valve means for opening the valve means when the temperature of the heat transfer material increases above a preset value, said liquified gas expanding in contact with the heat transfer material to cool the same and thereby chill the beverage within the bag, and dispensing means connected to the lower portion of the bag for dispensing the beverage from the bag to the exterior of the casing.

7. The structure of claim 6 and including means for applying a pressure to the upper portion of the bag to prevent dissolution of the carbon dioxide from the beverage and maintain a positive pressure on the beverage to aid in dispensing the same.

8. An apparatus for refrigerating and dispensing a beverage, comprising casing means having an opening therein, a shell disposed within the casing means and having an open end disposed in communication with the opening in the casing means, a door to enclose the opening in said casing means, the space between said casing means and the exterior of the shell defining a cooling chamber containing a liquid heat transfer material and the space defined by the shell and said door defining a beverage compartment adapted to contain a packaged beverage to be chilled and dispensed, a reservoir to contain a liquified gas, first conduit means connecting the reservoir with the lower end of the cooling chamber, means operably associated with said conduit means for expanding a liquified gas into contact with the heat transfer material in the cooling chamber to thereby chill the heat transfer material and cool the beverage contained within the beverage compartment, said liquified gas being expanded to the gaseous state and the gas passing upwardly within the heat transfer material, means for applying gas pressure to the beverage contained within the container, and dispensing means for dispensing the beverage from said container.

9. The apparatus of claim 8, in which the opening in said casing means is in the side wall of the casing means and the shell includes a bottom wall spaced from the bottom of the casing and a top wall spaced from the top of the casing, said shell also includes a pair of side walls and an end wall connected to the top and bottom walls and having an open end disposed in communication with the opening in the casing means.

References Cited by the Examiner

UNITED STATES PATENTS

| | | | |
|---|---|---|---|
| 966,076 | 8/1910 | Bobrick | 62—213 |
| 1,735,995 | 11/1929 | Davenport | 62—114 |
| 2,112,637 | 3/1938 | Swem | 62—389 X |
| 2,440,930 | 5/1948 | Camilli et al. | 62—389 X |
| 3,138,935 | 6/1964 | Morrison | 62—64 |
| 3,178,896 | 4/1965 | Sandsto | 62—389 X |

LLOYD L. KING, *Primary Examiner.*